United States Patent
Seliverstov

(10) Patent No.: US 7,449,874 B2
(45) Date of Patent: Nov. 11, 2008

(54) SYSTEM AND METHOD FOR VOLTAGE CONTROL OF ADJUSTABLE REGULATORS

(75) Inventor: Anatol Seliverstov, Framingham, MA (US)

(73) Assignee: Analog Devices, Inc., Norwood, MA (US)

( * ) Notice: Subject to any disclaimer, the term of this patent is extended or adjusted under 35 U.S.C. 154(b) by 83 days.

(21) Appl. No.: 11/247,776

(22) Filed: Oct. 11, 2005

(65) Prior Publication Data

US 2007/0080673 A1    Apr. 12, 2007

(51) Int. Cl.
G05F 1/565 (2006.01)
G06F 1/26 (2006.01)

(52) U.S. Cl. .................. 323/351; 713/300; 323/282

(58) Field of Classification Search .............. 307/154; 713/300; 323/283–284, 351, 282, 272, 285, 323/286
See application file for complete search history.

(56) References Cited

U.S. PATENT DOCUMENTS

| | | | |
|---|---|---|---|
| 4,015,191 A * | 3/1977 | Okumura | 323/282 |
| 6,181,120 B1 * | 1/2001 | Hawkes et al. | 323/282 |
| 6,456,049 B2 * | 9/2002 | Tsuji | 323/282 |
| 6,548,991 B1 | 4/2003 | Maksimovic et al. | |
| 6,717,390 B2 * | 4/2004 | Miyazaki et al. | 323/286 |
| 6,831,448 B2 * | 12/2004 | Ishii et al. | 323/282 |
| 2001/0052762 A1 | 12/2001 | Tsuji | |
| 2002/0075710 A1 | 6/2002 | Lin et al. | |
| 2004/0051509 A1 | 3/2004 | Matsuo et al. | |

OTHER PUBLICATIONS

"Variable Power Supply Output Voltage by Micro Processor Unit Upgrade Card" IBM Technical Exposure Bulletin, IBM Corp. New York, US, vol. 38, No. 5, May 1, 1995, pp. 439-440, XP000519639.
J. Kmetz, "0V to 25V Adjustable Regulator," MICREL, Application Hint 28, 1997, p. 3-205.
J. Dixon, "Adjustable Output Voltage 0.5V to 1.24V at 1.5A," MICREL, Application Hint 40b, Feb. 2002, San Jose, CA, p. 1.
M. Galinski, "DAC Controlled Output with Bypass," MICREL, Application Hint 52, Sep. 2003, San Jose, CA, pp. 1-2.
"High Efficiency 2MHz PWM Buck Converter with DAC Input and 40mΩ Bypass Switch," MICREL, MIC2224, Jan. 2005, San Jose, CA, pp. 1-13.
Y. Sharma, "Control a processor's power supply in real time," Analog Device, San Jose, CA, Mar. 31, 2005, pp. 82 & 84.

* cited by examiner

Primary Examiner—Akm Enayet Ullah
Assistant Examiner—Harry Behm
(74) Attorney, Agent, or Firm—Gauthier & Connors LLP

(57) ABSTRACT

A voltage regulator system is disclosed for providing a regulated voltage supply. The voltage regulator system includes a power supply input node for receiving a power supply input voltage, a regulated voltage output node for providing a regulated output voltage, and a feedback circuit coupled to the regulated output voltage node and to a voltage regulator input node wherein a non-zero voltage is provided by the voltage regulator input node.

5 Claims, 3 Drawing Sheets

US 7,449,874 B2

SYSTEM AND METHOD FOR VOLTAGE CONTROL OF ADJUSTABLE REGULATORS

BACKGROUND

The invention generally relates to power supply control systems, and relates in particular to adjustable control of voltage regulators.

Conventional controllers for voltage regulators, such as switched mode controller systems, include a controller interposed between a power source and a load, such as a digital signal processor. For example, as shown in FIG. 1, a conventional switched mode controller system includes an adjustable voltage regulator such as a switched mode converter 10 that couples a power supply 12 to a digital signal processor 14. The switched mode converter 10 receives a power supply input voltage 16 from the power supply 12 at a $V_{inps}$ node and provides a pulse width modulated signal at output node sw. The pulse width modulated (pwm) signal is then low pass filtered by an inductor 20 and capacitor 24 to provide an output voltage 18 ($V_{out}$) to the digital signal processor 14.

The input voltage $V_{inps}$ is typically provided to the converter 10 using a filter capacitor 22 that is also coupled to ground, and the output voltage is typically provided to the digital signal processor 14 using the filter capacitor 24 that is also coupled to ground. The controller 10 also includes a reference voltage 26 at a $V_{ref}$ node, and receives a feedback signal 28 at a feedback fb node.

The feedback signal is provided by a voltage divider circuit that includes a first resistor 30 ($R_1$) that is coupled to the output signal 18, and a second resistor 32 ($R_2$) that is coupled to ground. The voltage reference signal may be either provided via an external connection as shown or may be provided internally. The feedback signal 28 and the voltage reference signal are provided to a differential amplifier 13, and the output of the differential amplifier is provided to a pwm generation unit 11.

The pwm signal at the node sw is provided by the pwm generation unit 11 responsive to the output of the differential amplifier is employed to control the output of the supply input voltage $V_{inps}$ as well as the output of the differential amplifier.

The voltage $V_{out}$ is provided by the relationship $V_{out}=V_{ref}(1+R_1/R_2)$. The voltage $V_{out}$ is typically adjusted by changing the values of the resistors $R_1$ and $R_2$. The voltage $V_{out}$ however, may not be made to be less than $V_{ref}$ and such adjustments must be made by physically changing resistors or adjusting potentiometers. Certain further switched mode controllers employ a digital potentiometer that may be adjusted by changing a digital wiper value on the digital potentiometer using a digital control interface. Although the use of such a digital potentiometer may permit the controller to switch a power supply voltage in real time, the control circuit requires additional complex digital circuitry.

There is a need, therefore, for a more efficient and economical adjustable voltage controller system. There is further a need for an adjustable voltge controller that may be adjusted in real time and may be fully adjusted such that $V_{out}$ may be adjusted to be less than $V_{ref}$.

SUMMARY

The invention provides a voltage regulator system for providing a regulated voltage supply. The voltage regulator system includes a power supply input node for receiving a power supply input voltage, a regulated voltage output node for providing a regulated output voltage, and a feedback circuit coupled to the regulated output voltage node and to a voltage regulator input node wherein a non-zero voltage is provided by the voltage regulator input node.

In accordance with another embodiment, the invention provides a voltage controller circuit for a switched mode voltage controller. The voltage controller circuit includes a switched mode controller and a feedback circuit. The switched mode controller includes a voltage input node, a switched mode voltage output node, a voltage reference node, and a feedback node. The feedback circuit is coupled to the feedback node and includes a first resistor coupled to the feedback node and to the switched mode voltage output node, and a second resistor coupled to the feedback node and to a voltage controller input node. The voltage controller input node provides a non-zero input voltage.

In accordance with another embodiment, the invention provides a method of providing a switched mode voltage supply at a switched mode output voltage node. The method includes the steps of receiving a power supply input voltage, providing a pulse width modulated signal at the switched mode output voltage node, and coupling the switched mode output voltage node and a voltage controller input node to a feedback node wherein a non-zero voltage is provided by the voltage controller input node.

BRIEF DESCRIPTION OF THE DRAWINGS

The following description may be further understood with reference to the accompanying drawings in which.

The drawings are shown for illustrative purposes only.

DETAILED DESCRIPTION OF THE ILLUSTRATED EMBODIMENTS

The invention provides the ability to fully change a core voltage of a digital signal processor in real time in accordance with an embodiment. The control may be achieved by an additional serial communication link from a controller. The system provides in an embodiment that a conventional switched mode converter may be used, together with a single control line, to provide the core voltage to the digital signal processor. The system further permits the output voltage to be set below the level of the internal voltage reference $V_{ref}$.

Figure 1:
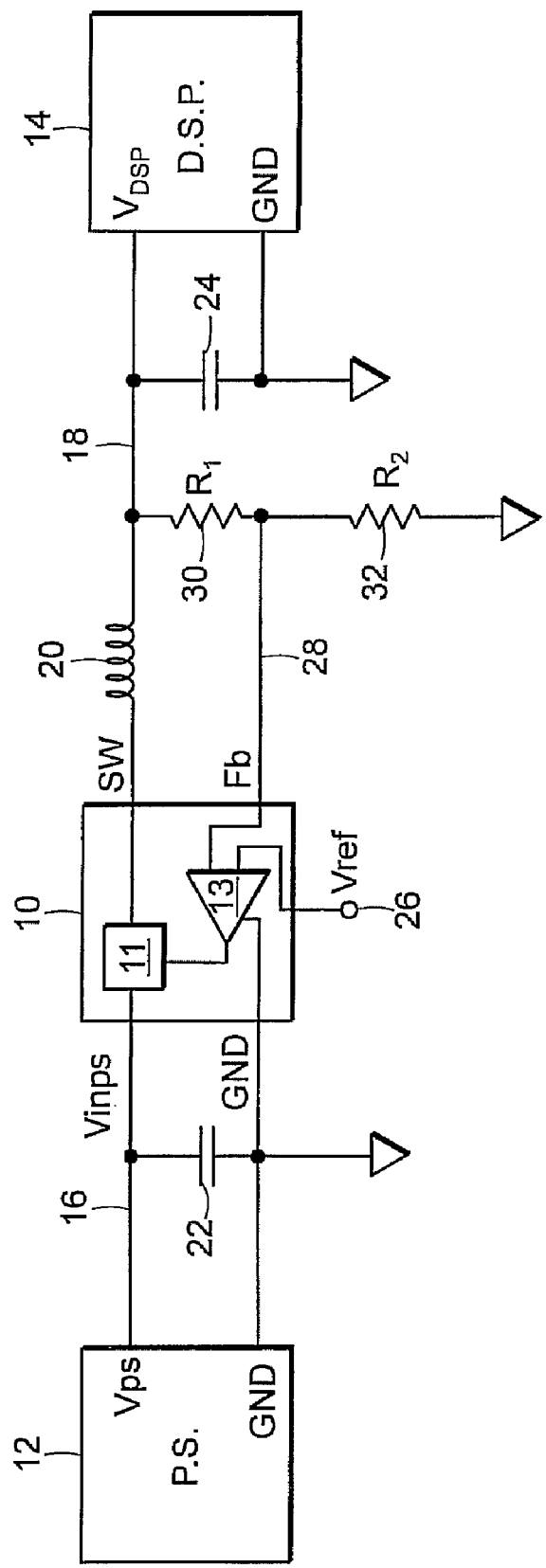
FIG. 1 shows an illustrative diagrammatic view of a switched mode controller of the prior art.
Figure 2:
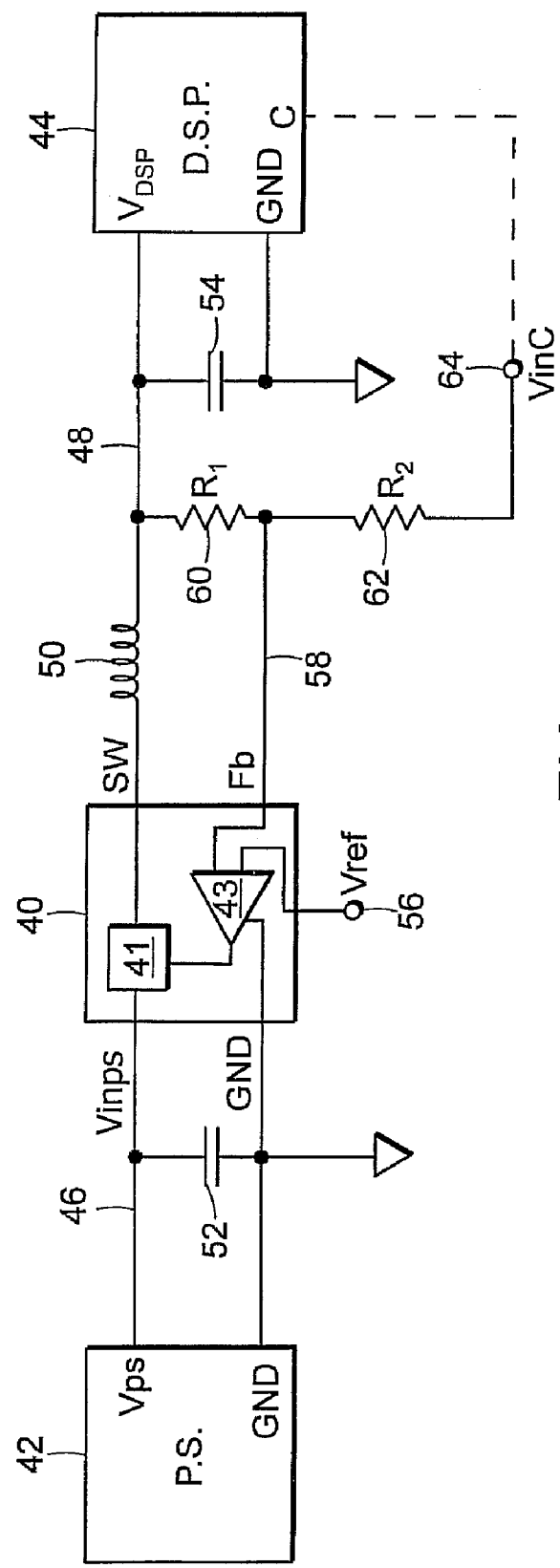
FIG. 2 shows an illustrative diagrammatic view of a switched mode controller in accordance with an embodiment of the invention.

A system in accordance with an embodiment of the invention is shown in FIG. 2. The system includes a switched mode converter 40 that couples a power supply 42 to a digital signal processor 44. The switched mode converter 40 receives a power supply input voltage 46 from the power supply 42 at a $V_{inps}$ node and provides a pulse width modulated signal at output node sw. The pwm signal is then low pass filtered by an inductor 50 and capacitor 54 to provide an output voltage 48 ($V_{out}$) to the digital signal processor 44.

The input voltage $V_{inps}$ is typically provided to the converter 40 using a filter capacitor 52 that is also coupled to ground, and the output voltage is typically provided to the digital signal processor 44 using the filter capacitor 54 that is also coupled to ground. The controller 40 also includes a reference voltage 56 at a $V_{ref}$ node, and receives a feedback signal 58 at a feedback fb node. The feedback signal is provided by a voltage divider circuit that includes a first resistor

60 ($R_1$) that is coupled to the output signal 48, and a second resistor 62 ($R_2$) that is coupled to a controller voltage source $V_{inC}$. The controller input voltage may be provided by the processor 44 itself (as shown at C), or may be provided by another independent voltage source. The voltage reference signal may be either provided via an external connection as shown or may be provided internally.

The feedback signal 58 and the voltage reference signal are provided to a differential amplifier 43, and the output of the differential amplifier is provided to a pwm generation unit 41. The output voltage at the node sw is provided by the pwm generation unit 41 responsive to the output of the differential amplifier 43 is employed to control the output of the supply input voltage $V_{inps}$ as well as the output of the differential amplifier.

The voltage $V_{out}$ is now provided by the relationship $$V_{out}=V_{ref}(1+R_1/R_2)-V_{inC}(R_1/R_2)$$

The voltage $V_{out}$, therefore, may be changed by changing $V_{inC}$, and may further be made to be less than $V_{ref}$.

Figure 3:
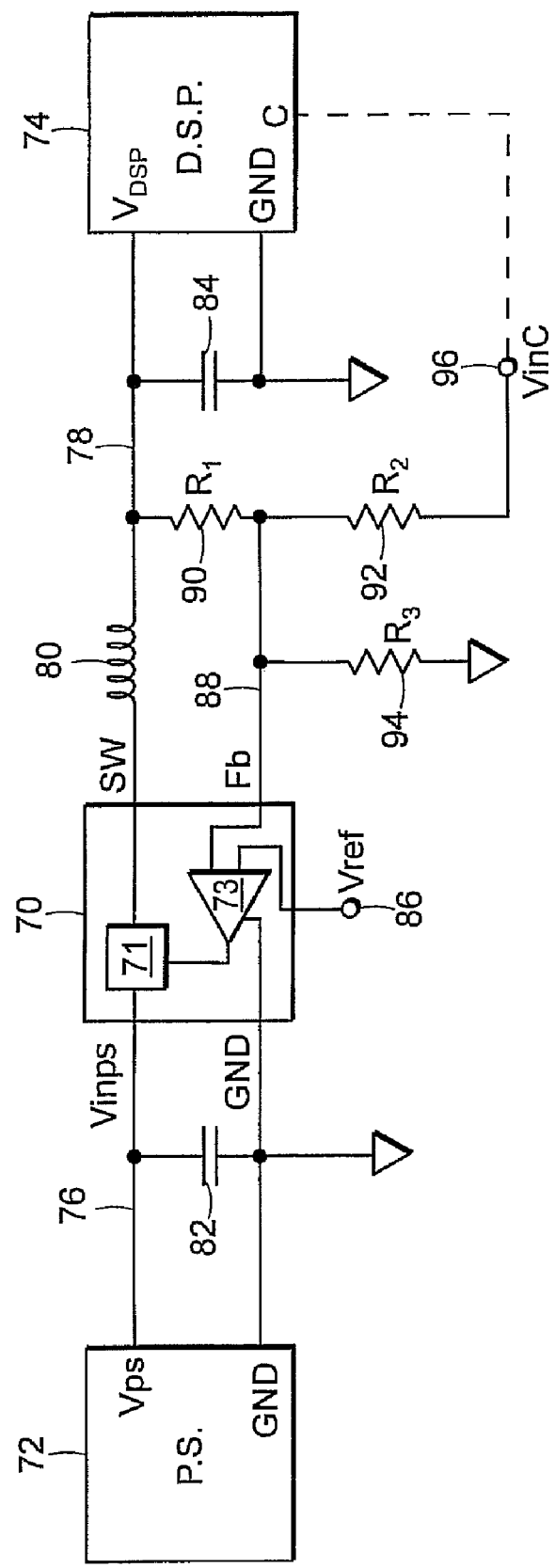
FIG. 3 shows an illustrative diagrammatic view of a switched mode controller in accordance with another embodiment of the invention.

A system in accordance with another embodiment of the invention is shown in FIG. 3. The system includes a switched mode converter 70 that couples a power supply 72 to a digital signal processor 74. The switched mode converter 70 receives a power supply input voltage 76 from the power supply 72 at a $V_{inps}$ node and provides a pwm signal at output node sw. The pwm signal is then low pass filtered by an inductor 80 and capacitor 84 to provide an output voltage 78 ($V_{out}$) to the digital signal processor 74. The input voltage $V_{inps}$ is typically provided to the converter 70 using a filter capacitor 82 that is also coupled to ground, and the output voltage is typically provided to the digital signal processor 74 using the filter capacitor 84 that is also coupled to ground.

The controller 70 also includes a reference voltage 86 at a $V_{ref}$ node, and receives a feedback signal 88 at a feedback fb node. The feedback signal is provided by a voltage divider circuit that includes a first resistor 90 ($R_1$) that is coupled to the output signal 78, and a second resistor 92 ($R_2$) that is coupled to a controller voltage source $V_{inC}$. The system of FIG. 3 further includes a third resistor 94 ($R_3$) that is coupled between the feedback node fb and ground. Again, the controller input voltage may be provided by the processor 74 itself, or may be provided by another independent voltage source. The voltage reference signal may be either provided via an external connection as shown or may be provided internally.

The feedback signal 88 and the voltage reference signal are provided to a differential amplifier 73, and the output of the differential amplifier is provided to pwm generation unit 71. The output voltage at the node sw is provided by the pwm generation unit 71 responsive to the output of the differential amplifier 73 is employed to control the output of the supply input voltage $V_{inps}$ as well as the output of the differential amplifier.

The voltage $V_{out}$ t is now provided by the relationship $$V_{out}=V_{ref}(1+R_1/R_2+R_1/R_3)-V_{inC}(R_1/R_2)$$

Again, the voltage $V_{out}$, therefore, may be changed by changing $V_{inC}$, and may further be made to be less than $V_{ref}$.

Those skilled in the art will appreciate that numerous modifications and variations may be made to the above disclosed embodiments without departing from the spirit and scope of the invention.

What is claimed is:

1. A voltage regulator system for providing a regulated voltage supply for a digital signal processor, said voltage regulator system comprising:

a power supply input node for receiving a power supply input voltage;

a regulated voltage output node for providing a switched node pulse width modulated regulated output voltage from a switched mode converter to said digital signal processor, said switched mode pulse width modulated regulated output voltage being provided by a pulse width modulation unit; and a feedback circuit coupled to said switched mode pulse width modulated regulated output voltage node and to a control node of said digital signal processor wherein an input voltage is provided by said control node of said digital signal processor, wherein said feedback circuit further includes a first resistor coupled to a feedback node and to said switched mode pulse width modulated regulated output voltage; and a second resistor coupled to said feedback node and to said control node of said digital signal processor wherein said voltage regulator input node provides a non-zero input voltage, and wherein the regulated output voltage node provides the output voltage ($V_{out}$), a voltage reference node $V_{ref}$ receives a reference voltage, the first and second resistors have resistor values of $R_1$ and $R_2$ respectively, and the output voltage $V_{out}=V_{ref}(1+R_1/R_2)-V_{inC}(R_1/R_2)$ where $V_{inC}$ is the input voltage, and wherein the output voltage $V_{out}$ which provides the regulated voltage supply for the digital signal processor is adjustable responsive to changes in the input voltage $V_{inC}$ by the digital signal procesor such that the output voltage may be set below the level of the internal voltage reference $V_{ref}$.

2. A voltage controller circuit for a switched mode voltage controller, said voltage controller circuit comprising:

a switched mode converter including a voltage input node, a switched mode voltage output node coupled to a digital signal processor, a voltage reference node, and a feedback node, wherein said switched mode voltage output node provides a pulse width modulated signal that is subjsequently low pass filter to provide a core voltage to the digital signal processor; and a feedback circuit coupled to said feedback node, the switched mode voltage output node, and to a control node of the digital signal processor, said feedback circuit comprising:

a first resistor coupled to said feedback node and to said switched mode voltage output node;

a second resistor coupled to said feedback node and to said control node of the digital signal processor wherein said control node of the digital signal processor provides a non-zero input voltage;

a third resistor coupled to said feedback node and to ground, wherein the switched mode output node is coupled to an out put voltage node via a low pass filter, and the out voltage node provides an output voltage ($V_{out}$), the voltage reference node of the switched mode converter receives a reference voltage $V_{ref}$, the first, second and third resistor value of $R_1$, $R_2$ and $R_3$ respectively, and the output voltage $V_{out}=V_{ref}(1+R_1/R_2+R_1/R_3)-V_{inC}(R_1/R_2)$ where $V_{inC}$ is the non-zero input voltage, and wherein the output voltage $V_{out}$ which provides a regulated voltage supply for the digital signal processor is adjustable responsive to changes in the input voltage $V_{inC}$ by the digital signal processor such that the output voltage may be set below the level of the internal voltage reference $V_{ref}$.

3. The voltage controller circuit as claimed in claim 2, wherein said low pass filter is an inductor.

4. A method of providing a switched mode voltage supply at a switched mode output voltage node as a supply voltage to a digital signal processor, said method comprising the steps of:

receiving a power supply input voltage;

providing a pulse width modulated signal to the digital signal processor at the switched mode output voltage node;

coupling said switched mode output voltage node to a feed back node via a first resistor, coupling the feedback node to a control voltage node of the digital signal processor via a second resistor, wherein the switched mode output voltage node is coupled to a low pass filter that provides a low pass filter pulse width modulated output voltage ($V_{out}$), a voltage reference node $V_{ref}$ receives a reference voltage, the first and second resistors have resistor value of $R_1$ and $R_2$ respectively, and the output voltage $V_{out}=V_{ref}(1+R_1/R_2)-V_{inC}(R_1/R_2)$ where $V_{inC}$ is a control voltage provided by the control voltage node; and changing the control voltage $V_{inC}$ by the digital signal processor to change the output voltage $V_{out}$ which provides the regulated voltage supply for the digital signal processor such that the output voltage may be set below the level of the internal voltage reference $V_{ref}$.

5. A method of providing a switched mode voltage supply at a switched mode output voltage node as a supply voltage to a digital signal processor, said method comprising the steps of:

receiving a power supply input voltage;

providing a pulse width modulated signal to the digital signal processor at the switched mode output voltage node;

coupling said switched mode output voltage node to a feedback node via a first resistor, coupling the feedback node to a control voltage node of the digital signal processor via a second resistor;

coupling the feedback node to ground via a third resistor, wherein the switched mode output voltage node is coupled to a low pass filter that provides a low pass filtered pulse width modulated output voltage ($V_{out}$), a voltage reference node $V_{ref}$ receives a reference voltage, the first, second and third resistors have resistor values of $R_1$, $R_2$ and $R_3$ respectively, and the output voltage $V_{out}=V_{ref}(1+R_1/R_2+R_1/R_3)-V_{inC}(R_1/R_2)$ where $V_{inC}$ is a control voltage provided by the control voltage node; and changing the control voltage $V_{inC}$ by the digital signal processor to change the output voltage $V_{out}$ which provides the regulated voltage supply for the digital signal processor and wherein $V_{out}$ may less than $V_{ref}$.

* * * * *